United States Patent
Iwase

(10) Patent No.: US 7,783,328 B2
(45) Date of Patent: Aug. 24, 2010

(54) CELLULAR PHONE CONTROL APPARATUS, METHOD OF CONTROLLING SAME AND HANDS-FREE CALL PLACEMENT APPARATUS

(75) Inventor: Takeshi Iwase, Aichi-gun (JP)

(73) Assignee: DENSO CORPORATION, Kariya (JP)

( * ) Notice: Subject to any disclaimer, the term of this patent is extended or adjusted under 35 U.S.C. 154(b) by 642 days.

(21) Appl. No.: 11/723,968

(22) Filed: Mar. 22, 2007

(65) Prior Publication Data

US 2008/0020806 A1 Jan. 24, 2008

(30) Foreign Application Priority Data

Mar. 27, 2006 (JP) ............... 2006-086197

(51) Int. Cl.
*H04M 1/00* (2006.01)
(52) U.S. Cl. ................... 455/569.1; 455/550.1
(58) Field of Classification Search .......... 455/550.1, 455/569.1, 569.2, 575.9; 379/420.01–420.04, 379/423
See application file for complete search history.

(56) References Cited

U.S. PATENT DOCUMENTS

2005/0048930 A1* 3/2005 Arimitsu ............... 455/90.2
2005/0277445 A1* 12/2005 Bae ..................... 455/569.1

FOREIGN PATENT DOCUMENTS

| JP | A-2003-023476 | 1/2003 |
| JP | A-2003-102058 | 4/2003 |
| JP | A-2003-115917 | 4/2003 |
| JP | A-2005-217526 | 8/2005 |
| JP | 2006-060293 | * 3/2006 |
| JP | A-2006-060293 | 3/2006 |

OTHER PUBLICATIONS

Notification of Reasons for Rejection issued from the Japanese Patent Office mailed on Jun. 1, 2010 in the corresponding Japanese patent application No. 2006-086197 (a copy and English translation thereof).

* cited by examiner

*Primary Examiner*—George Eng
*Assistant Examiner*—Jing (Kristen) Gao
(74) *Attorney, Agent, or Firm*—Posz Law Group, PLC

(57) ABSTRACT

A cellular phone control apparatus uses a predetermined association between a cellular phone and a call destination for controlling use of plural cellular phones. The predetermined association is stored in a memory of the control apparatus, and the call destination specified by a user is reflected to a selection of the cellular phone for placing a call to the call destination based on the predetermined association. In this manner, the user can selectively use plural cellular phones without changing configuration of the cellular phone control apparatus.

5 Claims, 4 Drawing Sheets

FIG. 3A

| NAME | MEMO | PHONE NO. | GROUP |
|------|------|-----------|-------|
| Mr. A |  | a | 1 |
| Mr. B |  | b |  |
| ⋮ |  | ⋮ |  |

FIG. 3B

| NAME | MEMO | PHONE NO. | GROUP |
|------|------|-----------|-------|
| Mr. C |  | c | 1 |
| Mr. D |  | d |  |
| ⋮ |  | ⋮ |  |

| NAME | MEMO | PHONE NO. | GROUP | HANDSET |
|---|---|---|---|---|
| Mr. A | | a | 1 | HANDSET 1 |
| Mr. B | | b | | HANDSET 2 |
| Mr. C | | c | | HANDSET 3 |
| Mr. D | | d | | HANDSET 4 |
| ⋮ | | ⋮ | | ⋮ |

CELLULAR PHONE CONTROL APPARATUS, METHOD OF CONTROLLING SAME AND HANDS-FREE CALL PLACEMENT APPARATUS

CROSS REFERENCE TO RELATED APPLICATION

This application is based on and claims the benefit of priority of Japanese Patent Application No. 2006-86197 filed on Mar. 27, 2006, the disclosure of which is incorporated herein by reference.

FIELD OF THE INVENTION

The present invention relates to a transmission control device for cellular phones. Particularly, it relates to a transmission control device capable of establishing connections simultaneously with plural cellular phones and a hands-free device incorporating the transmission control device.

BACKGROUND OF THE INVENTION

Transmission control devices, for example, like those used in some car navigation systems have been known which, by being connected to a cellular phone either wiredly or wirelessly, control the cellular phone and make it transmit a call to a predetermined telephone number. Such transmission control devices are normally used as hands-free devices in combination with a microphone and a speaker equipped in a vehicle. A transmission control device which is wirelessly connected to and controls a cellular phone is described, for example, in JP-A-2003-102058.

To have a cellular phone connected to the transmission control device, the ID of the cellular phone is registered in advance with the transmission control device. When an ID signal is received from the cellular phone, the transmission control device can determine that the cellular phone is the one registered with it. Based on the determination, the transmission control device establishes communications with the cellular phone.

In recent years, there are many people carrying plural cellular phones which include, for example, cellular phones provided by companies they work for and their privately-owned cellular phones. In such cases, they use different cellular phones for different call destinations. For example, they will usually use a privately owned cellular phone to make a private call and a company-provided cellular phone to make a business call.

Therefore, when using a hands-free device, too, it is necessary for them to use different cellular phones for different call destinations. Hands-free devices which have been in use are, however, either incapable of being connected to plural cellular phones or, even if they can be connected to plural cellular phones, capable of being connected to the plural cellular phones only according to a predetermined priority order, for example, according to the order of registration.

Therefore, when changing the cellular phone to be controlled by a hands-free device, it becomes necessary to change wire connections in a case where wired connections are used or to change connection settings in a case where wireless connections are used. In either case, troublesome work is involved. Requiring a vehicle driver to perform a procedure to change the cellular phone to use while driving is also quite problematic from a safety point of view.

SUMMARY OF THE INVENTION

The present invention has been made in view of the above circumstances, and it is an object of the present invention to provide a cellular phone control apparatus that is capable of changing the cellular phone to use according to a call destination without requiring troublesome configuration change.

The cellular phone control apparatus of the present disclosure includes a transceiver for exchanging a signal with a cellular phone, a call destination determination unit in the transceiver for determining a call destination number based on an input of a user, a memory in the transceiver for storing a relationship between the call destination number and a cellular phone, a cellular phone determination unit in the transceiver for determining the cellular phone for placing a call based on the relationship stored in the memory, and a call placement unit for placing a call to the call destination number determined by the call destination determination unit by controlling the cellular phone determined by the cellular phone determination unit. The transceiver of the cellular phone control apparatus exchanges the signal with plural cellular phones.

The cellular phone control apparatus of the present disclosure enables the user to select a specific cellular phone for placing a call to a certain call destination, based on the stored relationship between the call destination and the cellular phone in the memory. Therefore, the user can selectively use plural cellular phones without changing configuration of the cellular phone control apparatus for accommodating plural cellular phones.

BRIEF DESCRIPTION OF THE DRAWINGS

Other objects, features and advantages of the present invention will become more apparent from the following detailed description made with reference to the accompanying drawings, in which:

FIGS. 3A and 3B show illustrations of call destination data in the cellular phones in FIG. 1;

DETAILED DESCRIPTION

Figure 1:
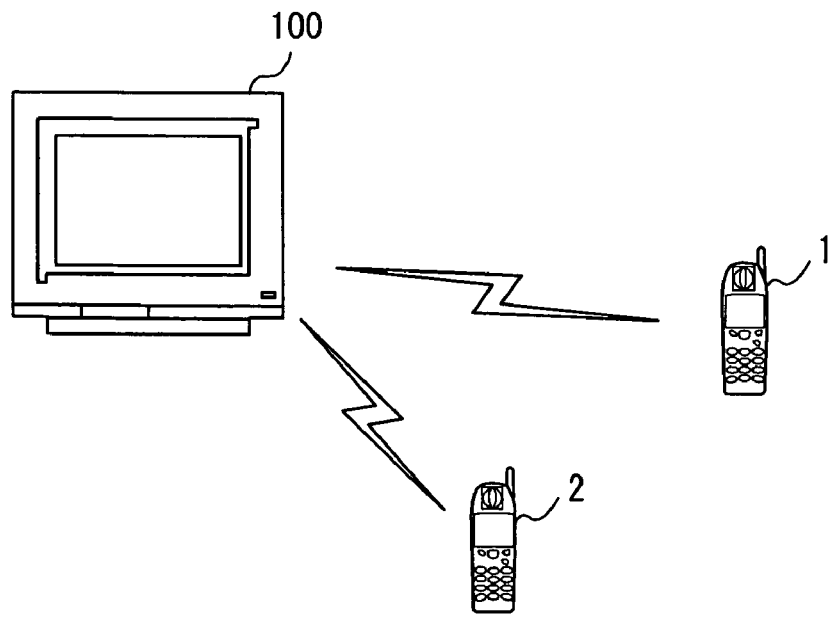
FIG. 1 shows an illustration of a hands-free call placement system in an embodiment of the present disclosure.

An embodiment of the present invention will be described with reference to the accompanying drawings. FIG. 1 is a block diagram showing the configuration of a hands-free telephone system. The hands-free telephone system includes a vehicle-mounted navigation system 100 having functions of a transmission control device and hands-free device for cellular phones according to the present invention, and cellular phones 1 and 2. Even though the two cellular phones are shown in FIG. 1, the number of cellular phones included in the hands-free telephone system may be only one, or more than two.

Figure 2:
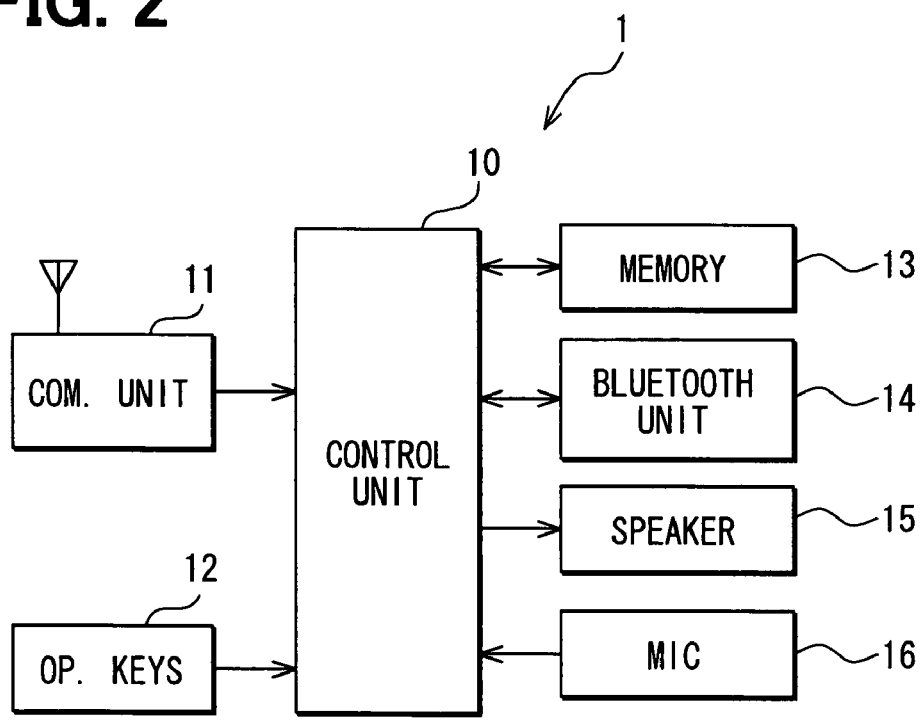
FIG. 2 shows a block diagram of a cellular phone illustrated in FIG. 1.

The cellular phone 1 usable in the hands-free telephone system shown in FIG. 1 is configured as shown in FIG. 2. The cellular phone 2 is configured similar to the cellular phone 1.

As shown in FIG. 2, the cellular phone 1 includes a control unit 10, a communication unit 11, an operation key group 12, a memory 13, a Bluetooth communication unit 14, a speaker 15, and a microphone 16. The control unit 10 is a computer internally having a CPU, a ROM, and a RAM, which are not shown in FIG. 2.

The communication unit 11 being controlled by the control unit 10 is connected to another cellular phone via a public telephone line network and transmits voice inputted from the microphone 16 to the another cellular phone and also receives voice transmitted from the another cellular phone. The received voice is outputted from the speaker 15. The communication unit 11 transmits and receives not only voice but data via the public telephone line network.

The operation key group 12 is disposed on the operation panel of the cellular phone 1 and includes 10 keys, i.e. from keys 0 to 9. The operation key group 12 is operated by a user. When the user operates the operation key group 12, signals corresponding to the operated keys are inputted to the control unit 10. The control unit 10 then executes various processes, for example, a telephone number search and call control according to the received signals.

The memory 13 is, for example, an EEPROM storing telephone directory data. The speaker 15 outputs the voice received by the communication unit 11. The microphone 16 detects the voice uttered by the user and outputs it to the control unit 10. The voice received by the control unit 10 is then sent to the communication unit 11.

The Bluetooth communication unit 14 communicates, based on a Bluetooth communication system which is a short-distance wireless communication system, wirelessly with another device having a Bluetooth communication unit. Short-distance wireless communication systems are used to wirelessly connect terminals which are apart from each other by up to about 10 meters. The Bluetooth communication unit 14 includes a modulator which modulates a signal to be transmitted and a demodulator which demodulates a received signal.

FIGS. 3A and 3B show examples of telephone directory data stored in the memory 13, FIG. 3A showing example telephone directory data stored in the memory 13 of the cellular phone 1 and FIG. 3B showing example telephone directory data stored in the memory 13 of the cellular phone 2.

As shown in FIGS. 3A and 3B, the telephone directory data include names, memo, telephone numbers, and groups arranged to indicate correspondences among them. The telephone directory of the cellular phone 1 shown in FIG. 3A includes data on persons A and B. The telephone directory of the cellular phone 2 shown in FIG. 3B includes data on persons C and D.

Figures 4, 5:
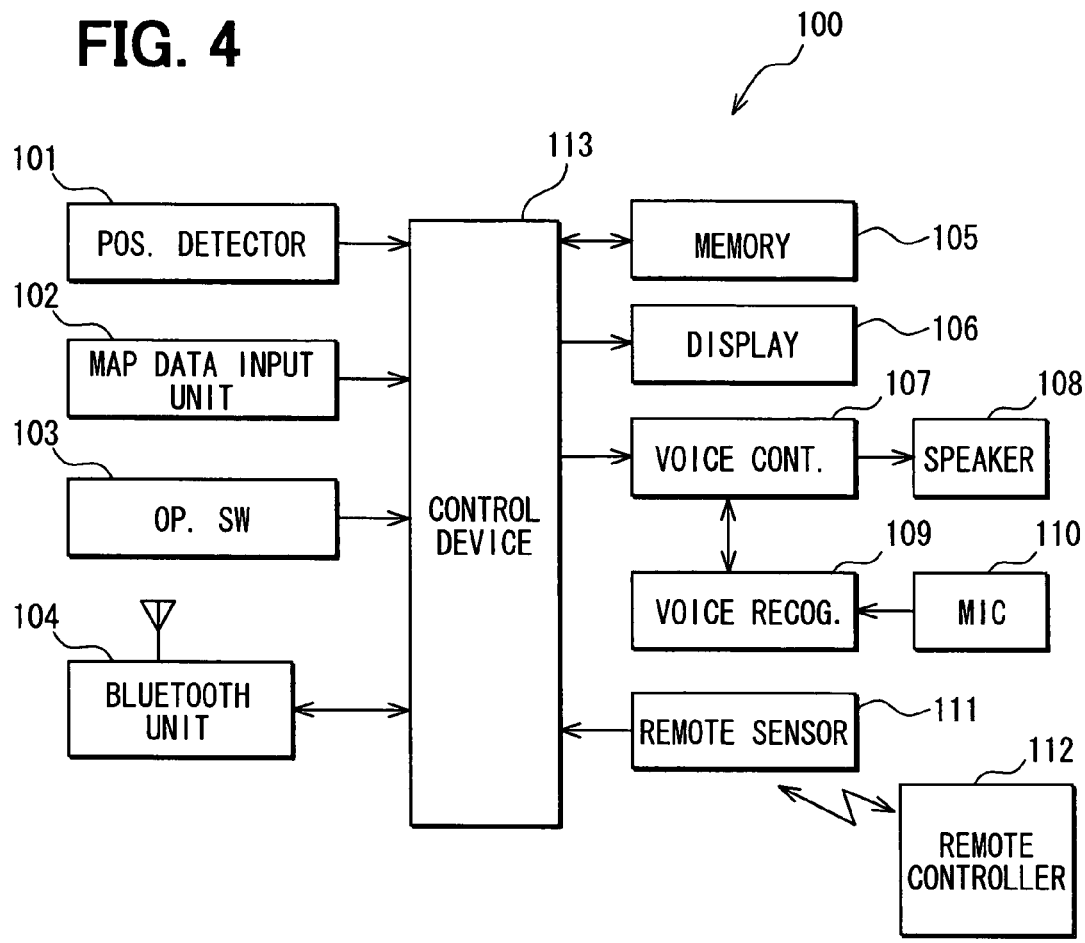
FIG. 4 shows a block diagram of a navigation system illustrated in FIG. 1.
FIG. 5 shows an illustration of a composite directory of call destination data.

FIG. 4 is a block diagram showing the configuration of the vehicle-mounted navigation system 100. The vehicle-mounted navigation system 100 includes a position detector 101, a map data input unit 102, an operation switch group 103, a Bluetooth communication unit 104, a memory 105, a display 106, a voice controller 107, a speaker 108, a voice recognition device 109, a microphone 110, a remote control sensor 111, and a remote control terminal (hereinafter referred to as the "remote controller") 112. These devices are connected to a control device 113 also included in the vehicle-mounted navigation system 100.

The control device 113 is an ordinary computer having such well-known components as a CPU, a ROM, a RAM, and an I/O circuit which are mutually connected by an internal bus line. The ROM stores programs to be executed by the control device 113. The CPU executes prescribed arithmetic operations using the programs.

The position detector 101 includes one or more of well-known devices used in a navigation system for detecting a vehicle position, for example, devices such as a geomagnetism sensor for detecting the absolute orientation of a vehicle, a gyroscope for detecting the relative orientation of the vehicle, a distance sensor which detects the distance traveled by the vehicle, and a GPS receiver for a global positioning system (GPS) which measures the position of the vehicle based on radio waves received from satellites. The current position of the vehicle detected by the position detector 101 is successively reported to the control device 113.

The map data input unit 102 is provided with a storage medium, not shown, for example, a DVD, ROM, or CD-ROM. The storage medium stores digital map data including road data, background data, text data, and facility data. Such data is inputted to the control device 113.

The operation switch group 103 includes touch switches integrated with the display 106 or mechanical switches provided in the vicinity of the display 106. The remote control Bluetooth communication unit 104 has plural operation switches, not shown, which enable input operations similar to those performed using the operation switch group 103. Signals representing input operations performed using the remote controller 112 are supplied to the control device 113 via the remote control sensor 111.

The Bluetooth communication unit 104 functions as a transmitting and receiving unit. It is a well-known Bluetooth communication device, the configuration of which is similar to that of the Bluetooth communication unit 14 of the cellular phone 1. It is capable of communicating simultaneously with plural other Bluetooth communication devices. Since each of the cellular phones 1 and 2 has the Bluetooth communication unit 14, the Bluetooth communication unit 104 makes it possible to carry out simultaneous communications between the vehicle-mounted navigation system 100 and the cellular phones 1 and 2.

The memory 105 is a writable storage medium, for example, a memory card or a hard disk. The memory 105 stores such user-set data as user's home location, text data, image data, and voice data. Composite telephone directory data created based on telephone directory data transmitted from one or more cellular phones is also stored in the memory 105. The composite telephone directory data being described in detail later includes data about correspondence between destination telephone numbers and cellular phones to be used. Therefore, the memory 105 is equivalent to a relationship storage device.

The display 106 is, for example, a liquid crystal display or organic light emitting display having a map display area where a road map of an area around the vehicle location is displayed. The display 106 also displays other information than the road map, such as current time and traffic congestion information.

The speaker 108 outputs voice (for example, voice information for navigation purposes, about screen operation, or on a result of voice recognition) to the outside based on a voice output signal inputted from the voice controller 107. The microphone 110 converts voice uttered by the operator into an electric signal and inputs the electric signal to the voice recognition device 109. The voice recognition device 109 compares the user's voice inputted from the microphone 110 and vocabulary data (patterns for comparison) included in an internal voice recognition dictionary (not shown), and inputs the most matching pattern to the voice controller 107 as a recognition result.

While controlling the voice recognition device 109, the voice controller 107 also performs, for the operator who inputted voice, talkback output control (voice output) via the speaker 108. Furthermore, it performs a process to input results of recognition made by the voice recognition device 109 to the control device 113.

The control device 113 processes the voice uttered by the operator in a prescribed way based on information from the voice recognition device 109. It also performs a prescribed process in response to input operation made using the operation switch group 103 or remote controller 112. The processes performed by the control device 113 include, for example, storing map data in the memory 9, changing a map scale, selecting a menu display, setting a destination, searching for a route, starting route guidance, correcting a current location, changing a display screen, and adjusting the voice volume.

Registering the cellular phones 1 and 2 in advance for control by radio communication and producing the composite telephone directory data are also performed by the control device 113.

The prior registration of a cellular phone is started when the operation prescribed for cellular phone registration is performed by the user of the cellular phone. The operation prescribed for cellular phone registration includes inputting the identification code of the cellular phone to be radio-controlled by the vehicle-mounted navigation system 100. The prior registration process performed by the control device 113 includes storing the identification code inputted by the user.

Each of the Bluetooth communication units 14 and 104 outputs a call signal to the outside at prescribed intervals. When one of the Bluetooth communication units 14 and 104 receives a call signal from another Bluetooth communication section, it determines that it is in a state where it can communicate with the Bluetooth communication section from which the call signal has been received and sends a response signal to the calling Bluetooth communication section. When the response signal is received, the calling Bluetooth communication section also determines that it is in a state where it can communicate with the Bluetooth communication section from which the response signal has been received.

When the Bluetooth communication unit 104 enters a state where it can communicate with the Bluetooth communication unit 14 of the cellular phone 1 or 2, it requests the cellular phone 1 or 2 to transmit the identification code. When the identification code received from the cellular phone 1 or 2 in response matches an identification code stored by the prior registration process, the Bluetooth communication unit 104 determines that the cellular phone 1 or 2 is in a state where it can be controlled by the Bluetooth communication unit 104, that is, in a connected state for radio communications. When plural cellular phones are in a connected state, one of them is selected as the cellular phone ready for communications and the others are left unselected.

The control device 113 can perform transmission control and voice transmission and reception control for the selected cellular phone via the Bluetooth communication unit 104. In the transmission control, a destination telephone number is specified, and a call is transmitted to the destination telephone number. In the voice transmission and reception control, the voice received by the selected cellular phone from the party talking with is outputted from the speaker 108, and the voice inputted to the microphone 110 is transmitted to the selected cellular phone, and the voice is then transmitted from the selected cellular phone to the party talking with.

In the process for producing the composite telephone directory data, the control device 113 obtains, via the Bluetooth communication unit 104 of the vehicle-mounted navigation system 100 and the Bluetooth communication unit 14 of each of the cellular phones 1 and 2, the telephone directory data stored in the cellular phones 1 and 2 along with the identification codes of the cellular phones 1 and 2. The identification codes of the cellular phones 1 and 2 are their telephone numbers stored in themselves, but their identification codes may be signals unique to them, for example, the IDs of the Bluetooth communication sections 14 of the cellular phones 1 and 2. The transmission of telephone directory data from the cellular phone 1 or 2 is started when prescribed transmission starting operation is performed at the cellular phone 1 or 2, or at the vehicle-mounted navigation system 100, or at both of them.

Figure 6:
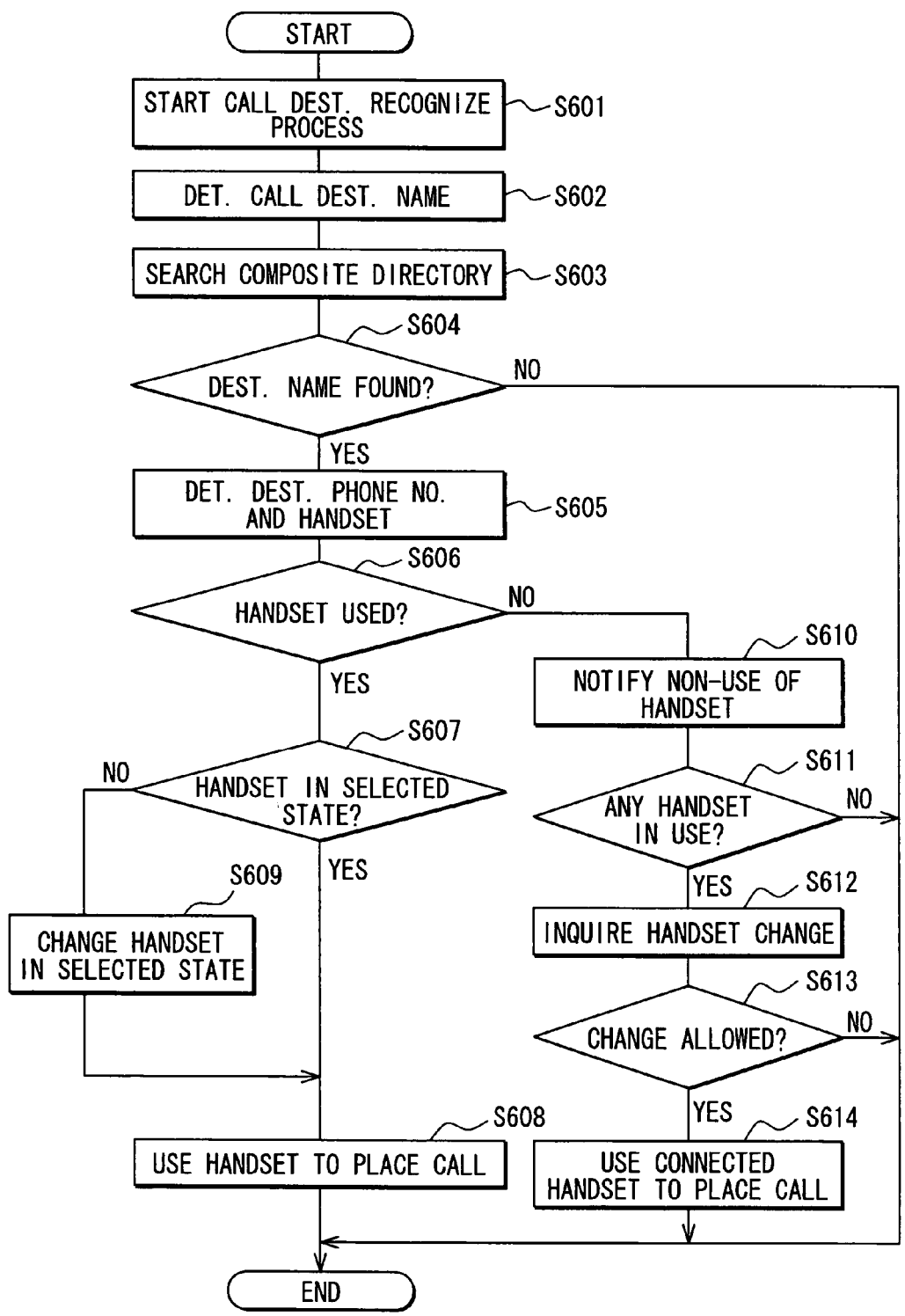
FIG. 6 shows a flowchart of a call control process in a control device in the navigation system.

When telephone directory data is received from the cellular phones 1 and 2, the control device 113 combines the received data and produces the composite telephone directory data. In doing so, the control device 113 adds an item "designated phone" to the composite telephone directory data. FIG. 5 shows an example of composite telephone directory data. In FIGS. 5 and 6, "designated phone" appears as "handset" for the brevity of representation in a limited space of drawings.

The "designated phone" is an item defining the cellular phone to be used, when a destination telephone number is determined, to call the destination telephone number. The item indicates the identification code (telephone number of each of the cellular phones 1 and 2) obtained, together with the telephone directory data, from each of the cellular phones 1 and 2.

When the telephone directory data of the plural cellular phones 1 and 2 include identical numbers, one of the cellular phones is determined to be the "designated phone" based on a prescribed rule, for example, according to the acquired order of the telephone directory data or a user-defined priority between the cellular phones 1 and 2. The composite telephone directory data inclusive of the "designated phone" may be modifiable either partly or entirely by user's input operation. The composite telephone directory data thus produced is stored in the memory 105.

The control device 113 executes a call control process as shown in FIG. 6 based on the composite telephone directory data stored in the memory 105. FIG. 6 shows an example of call transmission control performed based on voice input.

Referring to FIG. 6, a call destination recognition process is started in Step S601 by operating a predetermined start key or by uttering a word prescribed to start the process. The process includes a voice recognition process for determining a call destination. When the call destination recognition process is started, a dictionary for call destination recognition is selected from plural recognition dictionaries prepared for use in voice recognition. In this state, the voice recognition process can be performed based on the selected dictionary.

In Step S602, a call destination name is determined based on the call destination recognition process started in Step S601. For example, in Step S602, "person A" is determined to be the call destination name.

In Step S603, the composite telephone directory data is searched for the call destination name determined in Step S602. In Step S604, it is determined whether or not, as a result of the search, the call destination name has been found in the composite telephone directory data. When the call destination name has not been found, that is, when the determination in Step S604 is negative, the routine is terminated.

When the determination in Step S604 is affirmative, the process advances to Step S605 where, based on the composite telephone directory data, a telephone number corresponding to the call destination name determined in Step S602 is determined to be the destination telephone number. Thus, the steps leading to Step S605 of this routine, that is, Steps S601 through S605, are used for determining a call destination.

Additionally in Step S605, also based on the composite telephone directory data, the "designated phone" corresponding to the destination telephone number determined as described above is determined to be the cellular phone to be used for the call this time. Therefore, Step S605 is used for determining a cellular phone to be used. Alternatively, the cellular phone to be used may be determined, using the composite telephone directory data, based on the call destination name determined in Step S602. Even when the cellular phone to be used is determined in the alternative way, the cellular phone determined to be used corresponds to the destination telephone number with the destination telephone number corresponding to the call destination name.

The processing performed in Step S606 is used for checking the state of connection of the cellular phone to be used determined in Step S605. Namely, whether or not the cellular phone to be used is in a connected state is determined. To make such determination, first whether or not there is a connected cellular phone is determined and then, when there is a connected cellular phone, whether or not the identification code transmitted from the connected cellular phone agrees with the identification code of the cellular phone determined in Step S605 is determined.

When the determination in Step S606 is affirmative, whether or not the phone to be used is in a selected state is determined in Step S607. When, with the phone to be used being in a selected state, the determination in Step S607 is affirmative, the process advances to Step S608 where a call is transmitted from the cellular phone in a selected state to the destination telephone number determined in Step S605. When the determination in Step S607 is negative, the process advances to Step S609 where the phone selection is changed to put the cellular phone determined in Step S605 in a selected state. The process then advances to Step S608.

When the determination in Step S606 is negative, the process advances to Step S610. In Step S610, a predetermined voice message is outputted from the speaker 108 to make it known that the phone registered for use in calling the call destination name determined in Step S602 is not in a connected state.

In Step S611, whether or not there is a cellular phone in a connected state is determined. When the determination is negative, no call can be made and the routine is terminated. When the determination in Step S611 is affirmative, even though the phone determined to be used is not in a connected state, another cellular phone is in a connected state. Therefore, in Step S612, a message inquiring of the user whether or not transmitting a call from a cellular phone different from the one determined to be used is permissible is outputted from the speaker 108. In response to the inquiry, the user may confirm his or her intention as to whether or not to permit using such a cellular phone either verbally or by using the operation switch group 103. The processing of Steps S610 through S612 is used for the inquiry.

In Step S613, based on the user's response to the inquiry, it is determined whether or not transmitting a call using the cellular phone different from the one determined to be used is permitted. When the determination is affirmative, a call is transmitted, in Step S614, from the cellular phone in a connected state to the destination telephone number determined in Step S605. When the determination in Step S613 is negative, the routine is terminated. In this routine, the processing of Steps S606 through S609, S613, and S614 is used for transmission control.

According to the present embodiment described above, the memory 105 stores the composite telephone directory data defining the correspondence between destination telephone numbers and cellular phones to be used and, when a destination telephone number is determined for a call to be made, the cellular phone to be used for the call is determined according to the correspondence defined in the composite telephone directory data (Step S605). The call is then transmitted from the cellular phone determined to be used to the destination telephone number. In this way, it does not become necessary for the user to change settings, according to the destination telephone number, to change the cellular phone to be controlled by the vehicle-mounted navigation system 100.

According to the present embodiment, even when the cellular phone determined, based on the destination telephone number, to be used is not connected to the vehicle-mounted navigation system 100, if there is another cellular phone connected to the vehicle-mounted navigation system 100, a call can be transmitted from the connected cellular phone to the destination telephone number (Step S614). In such a case, the user is asked in advance in Step S612 whether or not he or she permits the call to the destination telephone number to be transmitted from the connected cellular phone, so that the user can avoid using any cellular phone he or she does not want to use.

Although the present invention has been fully described in connection with the preferred embodiment thereof with reference to the accompanying drawings, it is to be noted that various changes and modifications will become apparent to those skilled in the art.

For example, the cellular phones 1 and 2 may be connected to the navigation system 100 by wired connection instead of wireless connection.

Further, the call destination may be inputted and determined by keying the name of the destination.

Furthermore, the call destination number may be directly inputted by using keys and/or voice.

Furthermore, the Bluetooth communication unit 104 may be replaced with other communication unit such as an infrared communication unit or the like.

Such changes and modifications are to be understood as being within the scope of the present invention as defined by the appended claims.

What is claimed is:

1. A cellular phone control apparatus comprising:
a transceiver for exchanging a signal with a cellular phone, the transceiver being configured to exchange the signal with plural cellular phones;
a call destination determination unit in the transceiver for determining a call destination number based on an input of a user;
a memory in the transceiver for storing a relationship between the call destination number and a cellular phone;
a cellular phone determination unit in the transceiver for determining the cellular phone for placing a call based on the relationship stored in the memory;
a call placement unit for placing a call to the call destination number determined by the call destination determination unit by controlling the cellular phone determined by the cellular phone determination unit,
a connection examination unit for examining that the cellular phone determined by the cellular phone determination unit is being connectable to the transceiver;

a connection search unit for determining that another cellular phone is connectable to the transceiver when the cellular phone determined by the cellular phone determination unit is determined as not connectable by the connection examination unit; and a call placement inquiry unit for inquiring of the user a call placement by using the another cellular phone that is different from the cellular phone determined by the cellular phone determination unit when a connectable condition of the another cellular phone is determined by the connection search unit, wherein the call placement unit places a call to the call destination number determined by the call destination determination unit by controlling the another cellular phone upon having an affirmative answer for the inquiry by the call placement inquiry unit to the user.

2. The cellular phone control apparatus of claim 1,
wherein the transceiver is a radio communication unit,
the call placement control unit examines a registration of at least one of the cellular phone and the another cellular phone based on an identification code transmitted from the at least one of the cellular phone and the another cellular phone to the radio communication unit, and
the call placement control unit exclusively uses the at least one of the cellular phone and the another cellular phone that is registered to the apparatus for placing a call.

3. The cellular phone control apparatus of claim 1,
wherein call destination numbers in each of the plural cellular phones are transferred to the cellular phone control apparatus to be utilized as a composite directory, and
the user uses the composite directory to select one of the call destination numbers.

4. A hands-free call placement apparatus having elements and conditions of claim 1 further comprising:
a microphone for detecting a voice of the user; and
a speaker,
wherein the transceiver transmits the voice detected by the microphone to the cellular phone determined by the cellular phone determination unit for placing a call, and
the transceiver receives a voice signal from cellular phone determined by the cellular phone determination unit for placing a call for outputting the voice from the call destination to the speaker.

5. A method of controlling plural cellular phones in association with a call destination comprising:
providing a transceiver for exchanging a signal with each of the plural cellular phones;
providing a call destination determination unit in the transceiver for determining a call destination number based on an input of a user;
providing a memory in the transceiver for storing a relationship between the call destination number and at least one of the plural cellular phones;
providing a cellular phone determination unit in the transceiver for selectively determining a specific cellular phone among the plural cellular phones for placing a call based on the relationship stored in the memory;
providing a call placement unit for placing a call to the call destination number determined by the call destination determination unit by controlling the specific cellular phone determined by the cellular phone determination unit;
providing a connection examination unit for examining that the cellular phone determined by the cellular phone determination unit is being connectable to the transceiver;
providing a connection search unit for determining that another cellular phone is connectable to the transceiver when the cellular phone determined by the cellular phone determination unit is determined as not connectable by the connection examination unit; and
providing a call placement inquiry unit for inquiring of the user a call placement by using the another cellular phone that is different from the cellular phone determined by the cellular phone determination unit when a connectable condition of the another cellular phone is determined by the connection search unit,
wherein the call placement unit places a call to the call destination number determined by the call destination determination unit by controlling the another cellular phone upon having an affirmative answer for the inquiry by the call placement inquiry unit to the user.

* * * * *